United States Patent
Sohn et al.

(10) Patent No.: US 11,034,193 B2
(45) Date of Patent: Jun. 15, 2021

(54) PNEUMATIC TIRE WITH BEAD HAVING ENHANCED STIFFNESS

(71) Applicant: HANKOOK TIRE CO., LTD., Seoul (KR)

(72) Inventors: Gui Jung Sohn, Uiwang-si (KR); Hun Cheol Shin, Daejeon (KR)

(73) Assignee: HANKOOK TIRE CO., LTD., Seoul (KR)

( * ) Notice: Subject to any disclaimer, the term of this patent is extended or adjusted under 35 U.S.C. 154(b) by 568 days.

(21) Appl. No.: 15/424,754

(22) Filed: Feb. 3, 2017

(65) Prior Publication Data

US 2017/0267035 A1  Sep. 21, 2017

(30) Foreign Application Priority Data

Mar. 17, 2016  (KR) .......................... 10-2016-0031803

(51) Int. Cl.
| | |
|---|---|
| *B60C 15/05* | (2006.01) |
| *B60C 15/04* | (2006.01) |
| *B60C 15/00* | (2006.01) |

(52) U.S. Cl.
CPC .......... *B60C 15/05* (2013.01); *B60C 15/0018* (2013.01); *B60C 15/04* (2013.01); *B60C 2015/046* (2013.01)

(58) Field of Classification Search
CPC ..... B60C 15/00; B60C 15/0018; B60C 15/04; B60C 15/05; B60C 2015/046; B60C 15/0081; B60C 2015/048; B60C 15/0236; B60C 2015/0696; B60C 3/06; B29D 2030/485; B29D 30/48; B21F 37/00

USPC ......... 152/539, 540, 545, 550; 156/136, 422
See application file for complete search history.

(56) References Cited

U.S. PATENT DOCUMENTS

| | | | | |
|---|---|---|---|---|
| 2,966,933 | A | * | 1/1961 | Saint-Frison ....... B60C 15/0018 152/540 |
| 6,598,642 | B1 | * | 7/2003 | Hirai ................... B60C 15/0018 152/539 |
| 2008/0066843 | A1 | * | 3/2008 | Alvarez ................ B60C 9/0007 152/451 |

(Continued)

FOREIGN PATENT DOCUMENTS

| | | |
|---|---|---|
| KR | 10-0564512 | 3/2006 |
| KR | 10-2013-0075792 | 7/2013 |

*Primary Examiner* — Robert C Dye
*Assistant Examiner* — Sedef E Paquette
(74) *Attorney, Agent, or Firm* — Womble Bond Dickinson (US) LLP

(57) ABSTRACT

Disclosed is a pneumatic tire with a bead having enhanced endurance, more particularly, a pneumatic tire with a bead having enhanced stiffness in which at least one bead core is provided and a carcass does not have a turn-up structure at an end thereof such that stiffness of the bead and sidewall is enhanced. The pneumatic tire includes bead cores in which multi-layered bead wire cords are coiled, bead fillers adhering to the bead cores having at least two rows, and a carcass ply disposed between the bead cores of the bead fillers, the carcass ply having a linear shape without a turn-up structure, wherein a left bead filler and a right bead filler including the bead cores including the bead wire cords are disposed at both sides of the carcass ply, and each of the left and right bead fillers has a diameter decreasing upward from a bead base.

6 Claims, 6 Drawing Sheets

(56) References Cited

U.S. PATENT DOCUMENTS

2012/0145302 A1* 6/2012 Feltes ................. B60C 15/0027
                                                      152/541
2017/0348932 A1* 12/2017 Pialot ................. B60C 15/0018

* cited by examiner

PNEUMATIC TIRE WITH BEAD HAVING ENHANCED STIFFNESS

BACKGROUND OF THE INVENTION

Field of the Invention

The present invention relates to a pneumatic tire with a bead having enhanced endurance, more particularly, to a pneumatic tire with a bead having enhanced stiffness, in which at least one bead core is provided and a carcass has an end without a turn-up structure such that stiffness of the bead and a sidewall is enhanced.

Description of the Related Art

Generally, in a pneumatic tire, a bead is a part which is connected to a rim of a vehicle. The bead includes bead wire cords formed of steel, a bead core formed by rubberizing the bead wire cords with rubber layers having a uniform thickness, a rubber bead filler adhering to the bead core, and a bead toe, namely, a bead base surrounded by a carcass and a steel chafer while being mounted at the rim.

In addition, a carcass ply or carcass plies, which possess or support the bead core, are formed. The carcass ply may be manufactured by a turn-up manner and a fixed manner without a turn-up structure. The turn-up manner includes rolling up at least one bead core structure mounted at the bead. The fixed manner includes attaching high-strength rubber between the bead core structures having at least two rows arranged in series and fixing the carcass ply to between the bead core structures without the turn-up structure.

RELATED ART DOCUMENT

[Patent 001] Korean Laid-Open Patent Publication No. 10-2013-0075792 (Jul. 8, 2013)
[Patent 002] Korean Patent No. 10-0564512 (Mar. 20, 2006)

SUMMARY OF THE INVENTION

Therefore, the present invention has been made in view of the above problems, and it is an object of the present invention to provide a pneumatic tire with a bead having enhanced stiffness in which a carcass ply is disposed between bead core structures having two rows arranged in series without a turn-up roll structure to prevent residual stress of the carcass ply upon manufacture of the tire, while bead wires of the bead core are stably inserted to a bead filler, thereby enhancing stiffness of the bead and a sidewall.

In accordance with the present invention, the above and other objects can be accomplished by the provision of a pneumatic tire with a bead having enhanced stiffness including bead cores in which multi-layered bead wire cords are coiled, bead fillers adhering to the bead cores having at least two rows, and a carcass ply disposed between the bead cores of the bead fillers, the carcass ply being disposed to have a linear shape without a turn-up structure, wherein a left bead filler and a right bead filler including the bead cores including the bead wire cords are disposed at both sides of the carcass ply, and each of the left and right bead fillers has a diameter decreasing upward from a bead base.

In accordance with another aspect of the present invention, there is provided a bead without a turn-up structure of carcass plies since the carcass plies having two rows in a diverging state are inserted between three-row bead fillers.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, exemplary embodiment according to the present invention is described in detail with reference to the accompanying drawings. However, it should be understood that the present invention is not limited to the following embodiments and may be embodied in different ways, and that the embodiments are given to provide complete disclosure of the invention and to provide thorough understanding of the invention to those skilled in the art.

Figure 1:
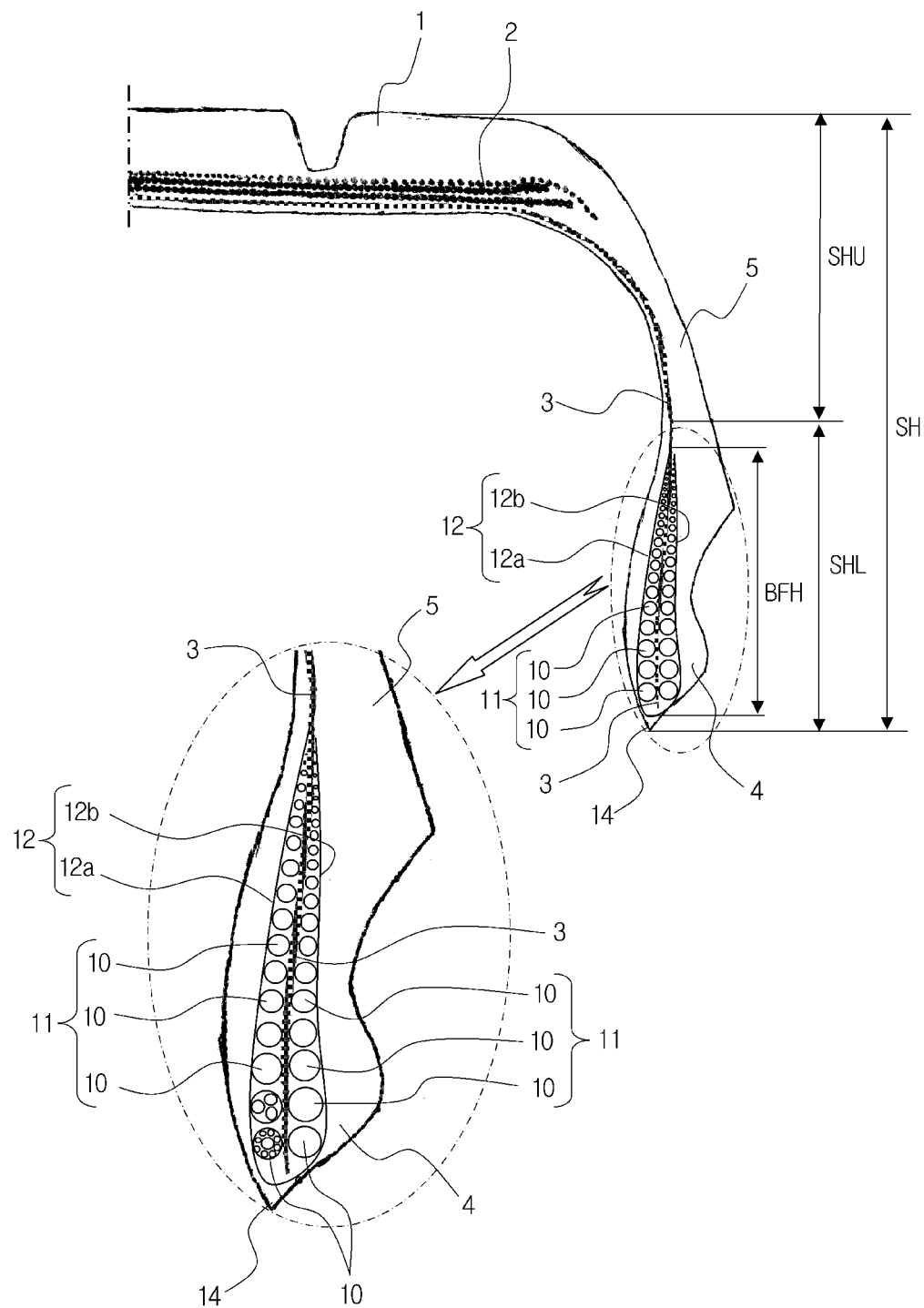
FIG. 1 is a partial cross-sectional view of a tire according to an embodiment of the present invention.

FIG. 1 is a partial cross-sectional view illustrating a pneumatic tire with a bead having enhanced stiffness according to an embodiment of the present invention. Generally, the tire includes a tread 1, a multi-layered belt 2 mounted in the tread 1, a carcass ply 3 functioning as a cord layer in the tire while supporting a load and forming a frame of the tire, a bead 4 functioning to mount the tire to a rim of a vehicle, and a sidewall 5 protecting the carcass ply 3 at a side of the tire while flexibly performing a flexion and extension movement.

According to the present invention including such the above structure of the tire, the tire is a pneumatic tire including bead cores 11 formed by bead wire cords 10 which are coiled in several layers, a bead filler 12 adhering to the bead cores 11 having at least two rows, and the carcass ply 3 between the bead cores 11 of the bead filler 12 while being disposed in a linear structure without a turn-up structure. A left bead filler 12a and a right bead filler 12b including the bead cores 11 having the bead wire cords 10 are disposed at both sides of the carcass ply 3. A diameter of each of the bead wire cords 10 of the left and right bead fillers 12a and 12b is decreased upward from a bead base 14.

Herein, a cross-sectional height SH of the tire includes an upper cross-sectional height SHU of the tire and a lower cross-sectional height SHL of the tire. A height BFH of each of the left and right bead fillers 12a and 12b is determined to be smaller than the lower cross-sectional height SHL of the tire in a separated state from the bead base 14. Each of the left and right bead fillers 12a and 12b has a triangular shape in which a cross section of each of the left and right bead fillers 12a and 12b becomes narrow upward.

Figure 2:
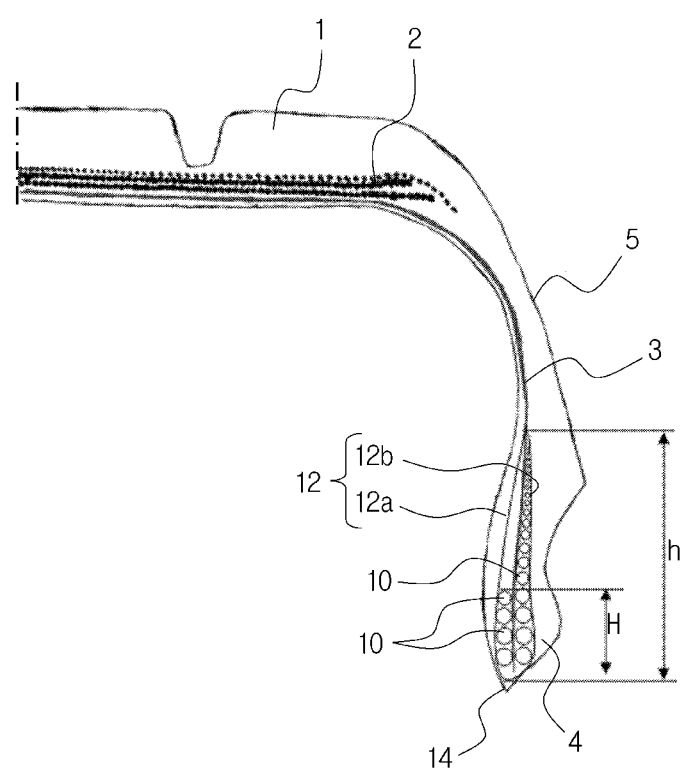
FIGS. 2 to 6 are partial cross-sectional views illustrating tires according to other embodiments of the present invention.
Figure 3:
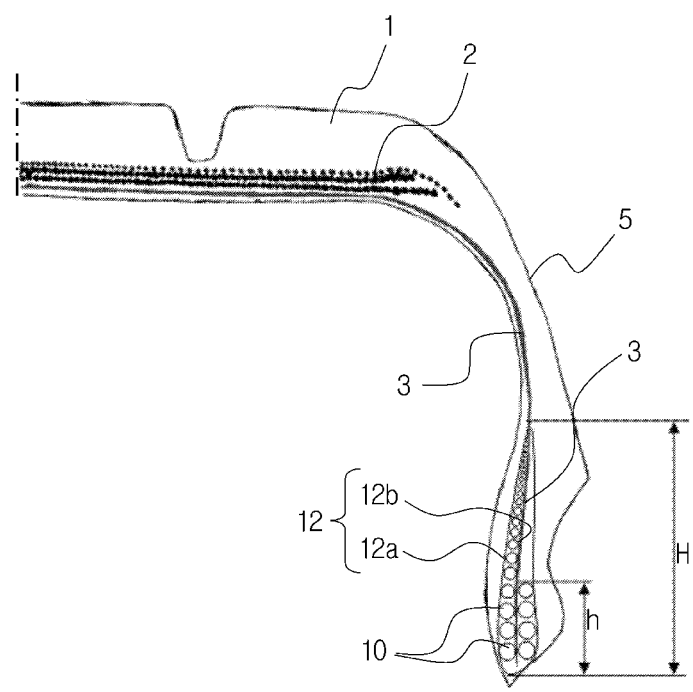

Additionally, according to other embodiments of the present invention, as illustrated in FIGS. 2 and 3, assembly heights H and h of the bead wire cords 10 respectively disposed at the left and right bead fillers 12a and 12b are different. For example, the assembly height H of the left bead filler 12a disposed inside the tire may be determined to be smaller than the assembly height h of the right bead filler 12b disposed outside the tire (H<h). On the contrary, the assembly height H of the left bead filler 12a may be determined to be greater than the assembly height h of the right bead filler 12b (H>h).

Figure 4:
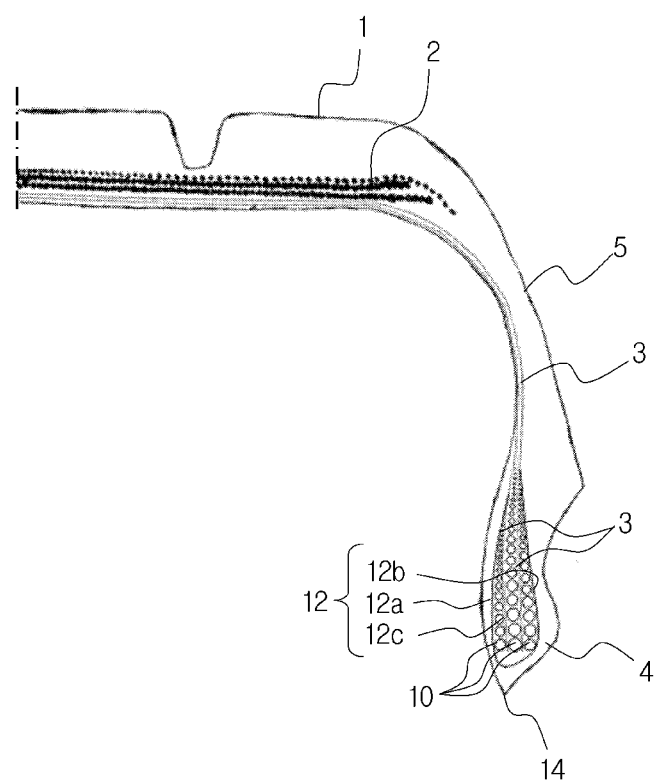
Figure 5:
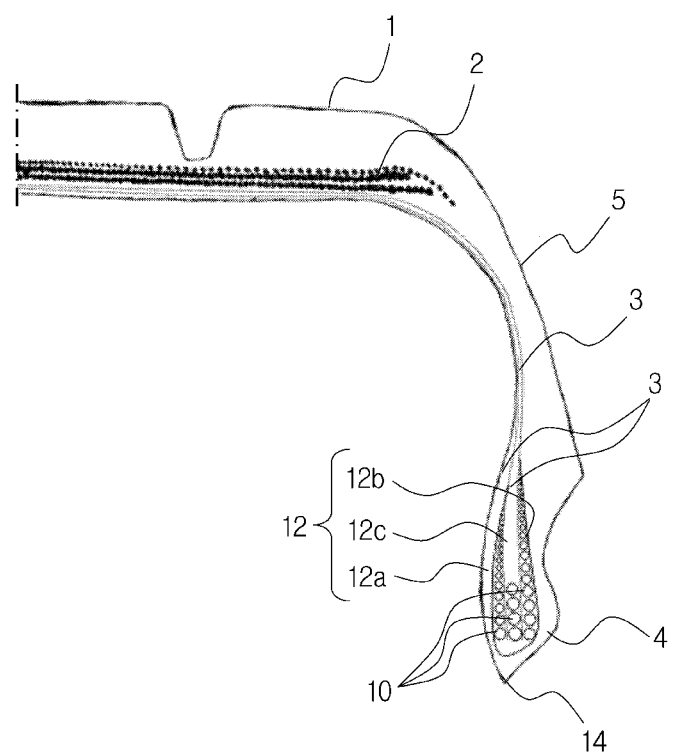
Figure 6:
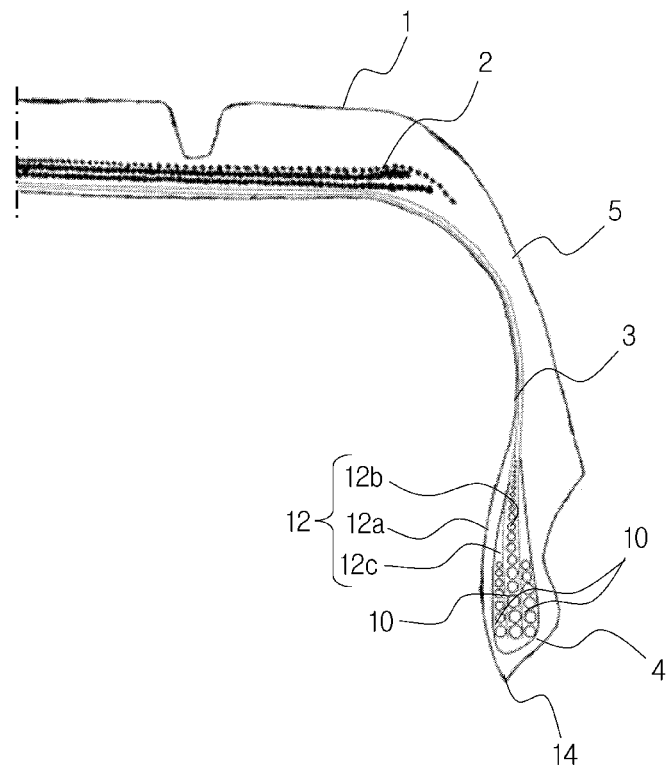

Meanwhile, FIGS. 4 to 6 are cross-sectional views illustrating the tires according to other embodiments of the present invention. The carcass plies 3 are disposed in two rows without a turn-up structure while being disposed between a left bead filler 12a, a right bead filler 12b, and a middle bead filler 12c surrounding the bead wire cords 10.

Herein, a diameter of each of the bead wire cords 10 disposed at the left, right and middle bead fillers 12a, 12b, and 12c divided by the carcass plies 3 having the two rows is decreased upward from the bead base 14.

As illustrated in FIGS. 5 and 6, an assembly height of the bead wire cords 10 disposed at the middle bead filler 12c is determined to be smaller than assembly heights of the bead wire cords 10 of the left and right bead fillers 12a and 12b. On the contrary, the assembly height of the bead wire cords 10 disposed at the middle bead filler 12c is determined to be greater than the assembly heights of the bead wire cords 10 of the left and right bead fillers 12a and 12b.

Figure 7:
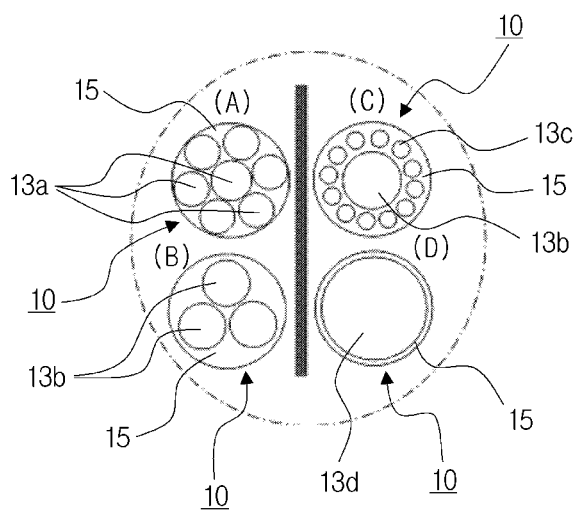
FIG. 7 is an enlarged cross-sectional view illustrating bead wire cord structures applied to the present invention.

As illustrated in FIG. 7, cross sections of the bead wire cords 10 surrounded by the bead fillers illustrated in FIGS. 1 to 6 may be varied. Namely, as illustrated in (A) and (B) of FIG. 7, a bundle of wires 13a having the same diameters while the diameter is smaller than a diameter of the bead wire cord 10 is provided. As illustrated in (C) of FIG. 7, a central wire 13b and peripheral wires 13c having smaller diameters than the central wire 13b while surrounding the central wire 13b are provided. As illustrated in (D) of FIG. 7, one wire 13d having the same diameter as the bead wire cord is provided. Each bead wire cord 10 is completed by providing isolating rubber 15 at a circumference of the wires 13a, 13b, 13c, and 13d.

According to the present invention, the pneumatic tire includes at least one carcass ply between the bead wire cord structures having at least two rows without the turn-up structure. The diameter of each of the bead wire cords is decreased upward from the bead base such that the bead wire cords are stably inserted to bead filler materials, thereby improving stiffness of the bead and the sidewall of the tire. Furthermore, the carcass ply is disposed to have a linear shape without the turn-up structure, thereby preventing residual stress of a carcass cord from being generated in comparison with the conventional carcass ply having the turn-up structure.

As apparent from the above description, in accordance with the present invention, in the pneumatic tire with the bead having enhanced stiffness, the diameter of each of the bead wire cords is decreased upward from the bead base such that the bead wire cords having different diameters are disposed to be extended along the bead filler having a triangular profile. Thereby, stiffness of the bead and the sidewall of the tire may be enhanced as a side reinforcement material (SRFM) is employed. On the drive, impact bulge of the tire generated in a dangerous case may be prevented through enhanced stiffness of the sidewall of the tire.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A pneumatic tire with a bead having enhanced stiffness comprising:
   bead cores, wherein each bead core comprises several bead wire cords that are concentrically arranged in a radial direction;
   bead fillers adhering to the bead cores having at least two rows; and
   a carcass ply disposed between the bead cores of the bead fillers, the carcass ply being disposed to have a linear shape without a turn-up structure in order to prevent residual stress of the carcass ply,
   wherein a left bead filler and a right bead filler comprising the bead cores including the bead wire cords are disposed at both sides of the carcass ply,
   wherein each of the bead wire cords of the left and right bead fillers has a diameter decreasing upward from a bead base, and the bead fillers are formed such that the bead cores each have a triangular profile in order to enhance stiffness of the bead and a sidewall of the tire,
   wherein each bead core having a triangular profile is within a bead filler also having a triangular profile, and
   wherein the bead wire cords of the left bead filler each have different diameters and the bead wire cords of the right bead filler each have different diameters.

2. The pneumatic tire according to claim 1, wherein the bead wire cords respectively disposed at the left and right bead fillers have assembly heights, and the assembly height of the left bead filler disposed at an inside of the tire is determined to be smaller than the assembly height of the right bead filler disposed at an outside of the tire.

3. The pneumatic tire according to claim 1, wherein the bead wire cords respectively disposed at the left and right bead fillers have assembly heights, and the assembly height of the left bead filler is determined to be greater than the assembly height of the right bead filler.

4. The pneumatic tire according to claim 1, wherein at least one of the bead wire cords comprises a bundle of wires, each wire in the bundle of wires having an identical cross-sectional diameter, wherein each of those diameters is smaller than a diameter of the respective bead wire cord.

5. The pneumatic tire according to claim 1, wherein each bead wire cord comprises a central wire and peripheral wires each having a cross-sectional diameter smaller than the central wire while surrounding the central wire.

6. The pneumatic tire according to claim 1, wherein each bead wire cord comprises one wire having a same cross-sectional diameter as the respective bead wire cord.

* * * * *